United States Patent [19]

Ohshima et al.

[11] Patent Number: 5,172,180
[45] Date of Patent: Dec. 15, 1992

[54] IMAGE FORMING EQUIPMENT WITH VARIABLE STEPWISE DRIVE MEANS OPERATION

[75] Inventors: Kiyoshi Ohshima; Shigeru Suzuki; Yoshiyumi Tamiya, all of Yokohama; Kenichi Shimizu, Kawasaki; Kazuaki Iizuka, Tokyo; Seiichi Miyakawa, Nagareyama, all of Japan

[73] Assignee: Ricoh Company, Ltd., Tokyo, Japan

[21] Appl. No.: 741,628

[22] Filed: Aug. 7, 1991

[30] Foreign Application Priority Data

Aug. 7, 1990 [JP] Japan ................... 2-208699

[51] Int. Cl.[5] ............... G03G 15/01; G01D 15/14
[52] U.S. Cl. ................... 355/326; 346/160; 355/317
[58] Field of Search ........... 355/326, 327, 317, 31; 346/160, 76 PH

[56] References Cited

U.S. PATENT DOCUMENTS

4,590,490 5/1986 Takanashi et al. .......... 346/76 PH
5,023,633 6/1991 Ito .......................... 346/160

Primary Examiner—A. T. Grimley
Assistant Examiner—Shuk Y. Lee
Attorney, Agent, or Firm—Oblon, Spivak, McClelland, Maier & Neustadt

[57] ABSTRACT

Image forming equipment for performing a predetermined image forming operation by use of a stepwise drive source such as a stepping motor or pulse motor. Either one of a recording medium and a record head is driven by a pulse motor, and whether or not it has reached a predetermined position is determined. While such a decision as to the position of the recording medium or the record head is under way, the displacement per step is changed over to a displacement per step smaller than a displacement to be effected while the predetermined image forming operation is under way.

8 Claims, 7 Drawing Sheets

IMAGE FORMING EQUIPMENT WITH VARIABLE STEPWISE DRIVE MEANS OPERATION

BACKGROUND OF THE INVENTION

The present invention relates to image forming equipment of the type performing a predetermined image forming operation by use of a stepwise drive source such as a stepping motor or pulse motor.

Today, a copier, facsimile transceiver, printer or similar image forming equipment implemented with an electrophotographic procedure or an electrostatic recording procedure is extensively used. This kind of equipment usually has a stepping motor or pulse motor or similar stepwise drive source for transporting a recording medium or moving either one of scanning optics and a document, as disclosed in Japanese Patent Laid-Open Publication No. 179477/1986 by way of example. It has been customary to provide such equipment with a sensor for determining whether or not a member to be driven stepwise such as a recording medium has reached a predetermined position at least upstream of a position where an image forming operation is to begin with respect to the direction of movement of the member of interest. The above-mentioned predetermined position is used as a reference.

In the stepwise drive described above, a step made up of a drive state wherein the recording medium, for example, is in movement and a stop state wherein it is in a halt is repeated. At least in the drive state, it is impossible to forcibly and immediately stop the movement of the recording medium, i.e., the movement is controlled only on a step basis. This brings about a drawback that when the recording medium is moved with the above-mentioned predetermined position used as a reference, an error corresponding to the displacement caused by one step at maximum occurs at the start of the image forming operation. While the displacement per step may be reduced to reduce such an error, a decrease in the displacement directly translates into an increase in the period of time necessary for the image forming operation to be completed.

SUMMARY OF THE INVENTION

It is therefore an object of the present invention to provide image forming equipment which reduces the period of time necessary for an image forming operation to be completed.

It is another object of the present invention to provide image forming equipment which reduces the error in the position for starting an image forming operation which is based on a predetermined reference position.

Image forming equipment for starting a predetermined image forming operation by moving a movable member while using a predetermined position as a reference of the present invention comprises a stepwise drive source for moving the movable member stepwise in the equipment to execute the predetermined image forming operation, a sensor for determining whether or not the movable member has reached the predetermined position, and a displacement changing means for changing over the displacement of the movable member per step of the stepwise drive source such that while the sensor is determining whether or not the movable member has reached the predetermined position, the displacement is changed to a displacement per step smaller than a displacement effected when the predetermined image forming operation is under way.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Referring to FIGS. 1 through 5, image forming equipment embodying the present invention is shown. The illustrative embodiment pertains to an electrostatic recording system which forms a color image on a recording medium by sequentially overlaying yellow (Y), magenta (M) and cyan (C) image components produced by color separation. The recording medium is implemented as a webbing of electrostatic recording material. The recording medium is transported by a stepwise drive source such as a stepping motor or pulse motor.

Figure 1:
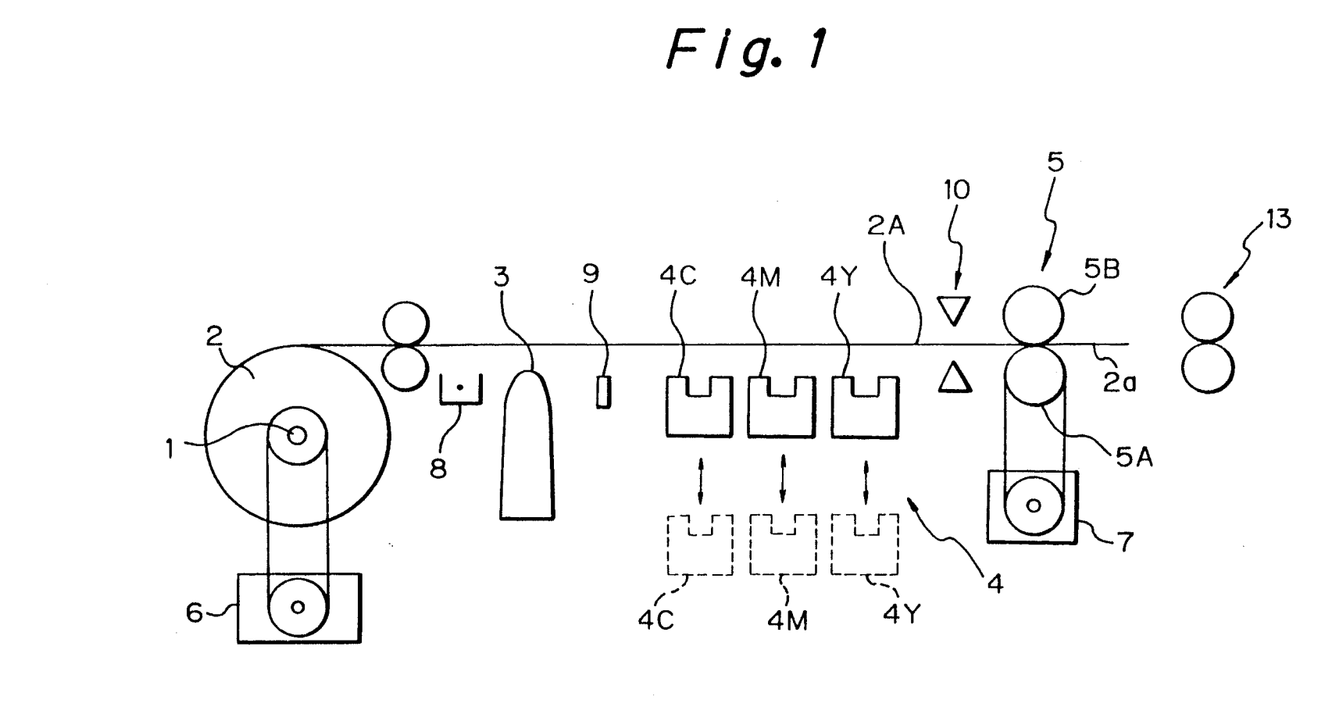
FIG. 1 is a view showing image forming equipment embodying the present invention.

As shown in FIG. 1, a recording medium 2 in the form of a roll is wound on a supply shaft 1. Before a recording operation, part 2A of the recording medium 2 having been paid out from the shaft 1 extends over an electrostatic record head 3 and a developing device 4 and has the leading edge 2a thereof nipped by a roller pair 5 made up of a drive roller 5A and a pinch roller 5B. This state of the equipment will be referred to as a standby state hereinafter. The supply shaft 1 is connected to a reversible torque motor 6 while the drive roller 5A is connected to a reversible pulse motor 7. The developing device 4 has three develop heads 4Y, 4M and 4C respectively assigned to the colors Y, M and C. An elevating device is associated with the developing device 4 for moving each of the develop heads 4Y, 4M and 4C between two different positions independently of the others. Specifically, the heads 4Y, 4M and 4C each are movable up and down between a developing position (indicated by a solid line in the figure) where it faces a medium transport path and a standby position (indicated by a phantom line in the figure) below the developing position.

After data to be recorded and sent from a data processing unit has been fully processed, the pulse motor 7 and torque motor 6 are energized to rotate the drive roller 5A and supply shaft 1 clockwise. As a result, the recording medium 2 is paid out from the supply shaft 1. Such a drive of the motors 6 and 7 and such a transport of the recording medium 2 will hereinafter be referred to as a forward drive and a forward transport, respectively. While the medium 2 is so paid out, a charger 8 uniformly charges it over a predetermined length. The record head 3 writes a register mark A, FIG. 2, in a particular area of the recording sheet 2 other than an image forming area. The register mark A is used as a reference for detecting the beginning of a recording operation. The develop head 4C develops the register mark A. Thereafter, the pulse motor 7 and torque motor 6 are reversed to rotate the drive roller 5A and supply shaft 1 counterclockwise. Such a drive of the motors 6 and 7 and the resultant transport of the recording sheet 2 will hereinafter be referred to as a reverse drive and a reverse transport. Specifically, the recording medium 2 is transported in the reverse direction until an optical sensor 9 interposed between the record head 3 and the developing device 4 senses the developed register mark A. When the sensor 9 has sensed the register mark A, the pulse motor 7 and torque motor are again driven in the forward direction to transport the medium 2 in the forward direction. While the medium 2 is so transported, the charger 8 uniformly charges the image forming area of the medium 2. The record head 3 writes a C image component in the charged area of the medium 2 under write start control which will be described. The develop head 4C which is moved to the developing position beforehand develops the C image component. After the whole C image component has been developed, the pulse motor 7 and torque motor 6 are reversed to move the medium 2 in the reverse direction until the sensor 9 senses the register mark A again.

Subsequently, Y and M image components are sequentially written and developed in the same manner as the C image component with the result that a three-color image is formed on the recording medium 2. A cutter 10 is driven just before the leading edge of the image passes it to thereby cut off the marginal portion of the medium 2 which precedes the leading edge of the image. The cutter 10 is driven again just after the trailing edge of the image has moved away from the cutter 10, thereby cutting the medium 2. Thereafter, drive roller 5A and supply shaft 1 are brought to a stop. Only a discharge roller pair 13 is rotated to drive the cut length of the medium 2, i.e., a sheet to a discharge tray, not shown.

The write start control over the record head 3 is as follows. The record head 3 is caused to start writing image data in the recording medium 2 when the sensor 9 has sensed the trailing edge α, FIG. 2, of the register mark A with respect to the forward direction. For example, the output level of the sensor 9 changes at the moment when the trailing edge α of the register mark A passes the sensor 9. The stepwise drive of the recording medium 2 by the pulse motor 7 and the writing operation of the record head 3 are synchronized to each other such that the record head 3 writes one line of data in the medium 2 when the medium 2 is in a halt. While the medium 2 is in movement, it cannot be forcibly immediately stopped when the sensor 9 has sensed the trailing edge α of the register mark A. Hence, the record head 3 writes the first line of data in the medium 2 when the medium 2 is brought to a stop by the first step of drive after the detection of the trailing edge of the register mark A.

Figure 2:
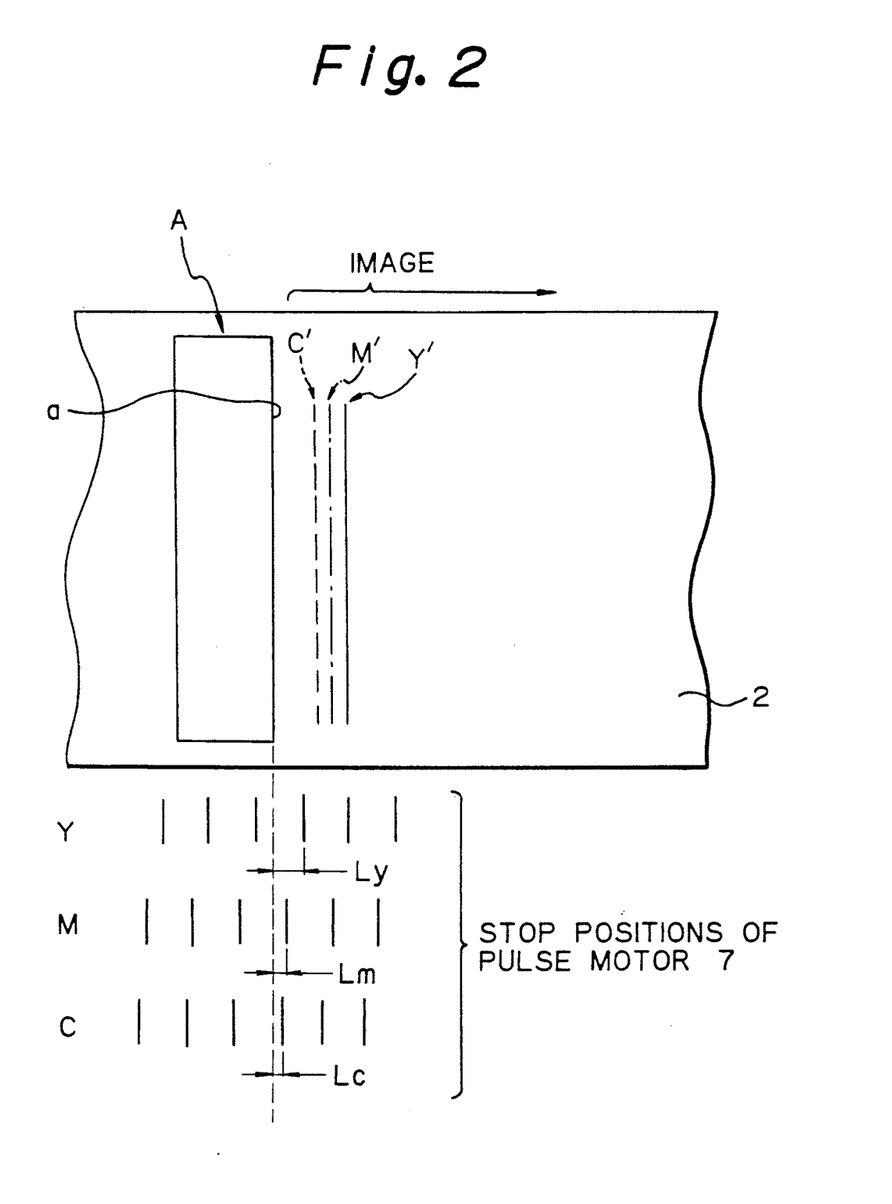
FIGS. 2 and 3 each shows a particular transport condition of a recording medium.

However, the portion of the recording medium 2 that faces the record head 3 when the medium 2 is stopped by the above-mentioned first step of drive differs from one color to another of Y, M and C due to various factors particular to the reciprocating movement of the medium 2. As a result, the position where the first line of data should be written is not the same among the color components Y, M and C. In FIG. 2, Y', M' and C' are respectively representative of the portions of the recording medium 2 which the record head 3 faces when the medium 2 is brought to the above-mentioned first stop. Pulse motor stop positions shown below the recording medium 2 in FIG. 2 are representative of the portions of the medium 2 which the record head 3 has faced at successive stop positions up to the time of detection of the trailing edge α of the register mark A with respect to the color components Y, M and C. Further, Ly, Lm and Lc are indicative of the distances which the medium 2 has moved during the interval between the detection of the trailing edge α of the register mark A and the first stop of the medium 2. As shown, the color components Y, M and C are deviated on the recording medium 2, and the maximum deviation is equal to the displacement of the medium 2 caused by one step of drive. While the displacement of the medium 2 per step may be reduced to reduce the deviation, such a scheme increases the recording time, as stated earlier.

In light of this, while the sensor 9 is determining whether or not the trailing edge α of the register mark A has reached it, the illustrative embodiment selects a displacement of the recording medium 2 per one step of drive of the pulse motor 7, which is smaller than a displacement to be effected while an image recording operation is under way. Specifically, the embodiment changes over the displacement of the medium 2 by selecting either one of the full step angle or half step angle of the pulse motor 7.

Figure 4:
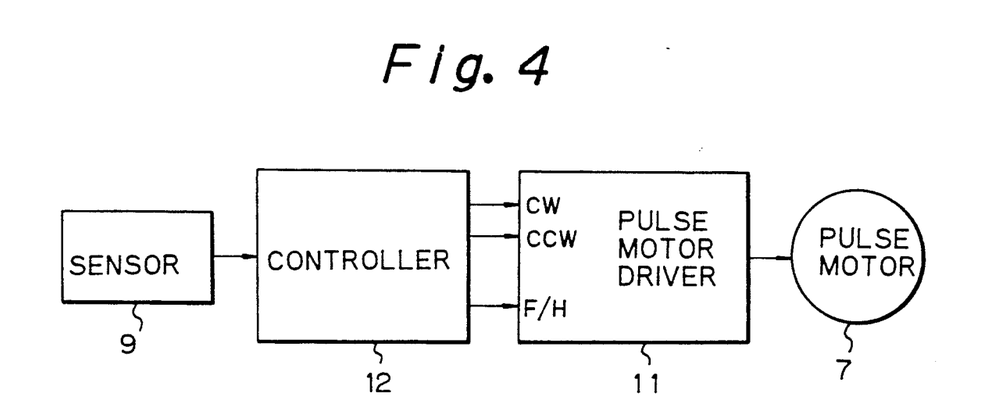
FIG. 4 is a block diagram schematically showing control circuiry included in the embodiment for changing over the displacement of a recording medium.

FIG. 4 is a schematic block diagram of control circuitry for changing over the displacement of the recording medium 2 as stated above. The pulse motor 7 is a 5-phase motor whose full step angle is 0.72 degree. A pulse motor driver 11 has input ports CW and CCW for receiving clock signals which rotate the pulse motor 7 in clockwise and counterclockwise directions, and an input port F/H for receiving a signal for selectively driving the pulse motor 7 at the full step angle or a half step angle (0.36 degree) depending on the level "H" or "L" of the signal. A controller 12 delivers such signals to the pulse motor driver 11 in response to the output of the optical sensor 9. The pulse motor 7 transports the recording medium 2 by one line when driven at the full step angle. This, coupled with the fact that the stepwise drive and the one-line writing operation are synchronous, reduces the deviations of the entire image if the deviations among Y, M and C at the write position of the first line are reduced.

Figure 3:
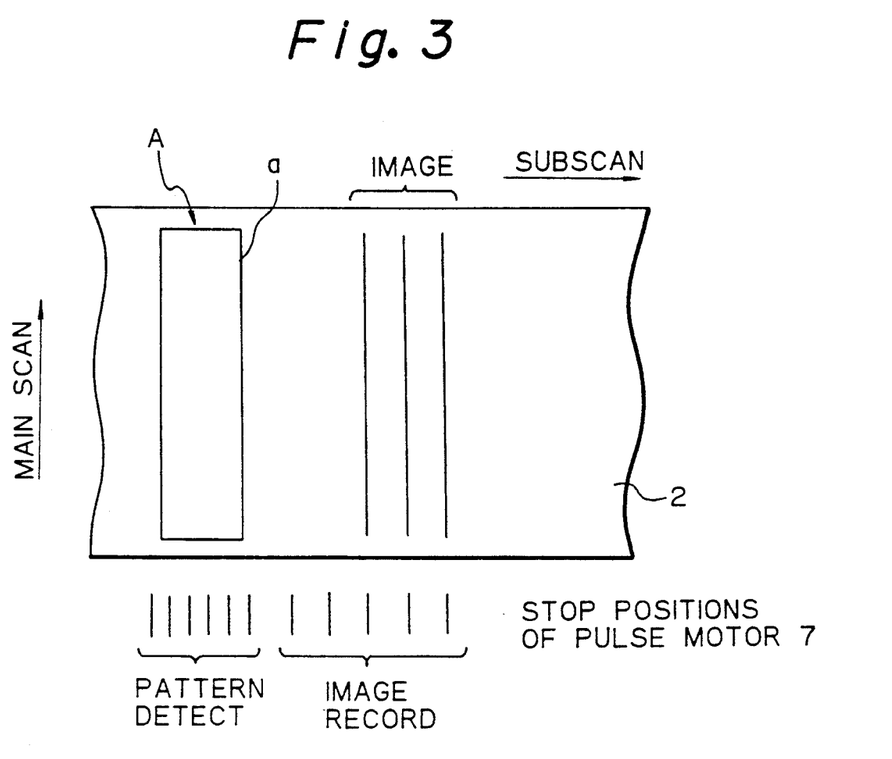
Figure 5:
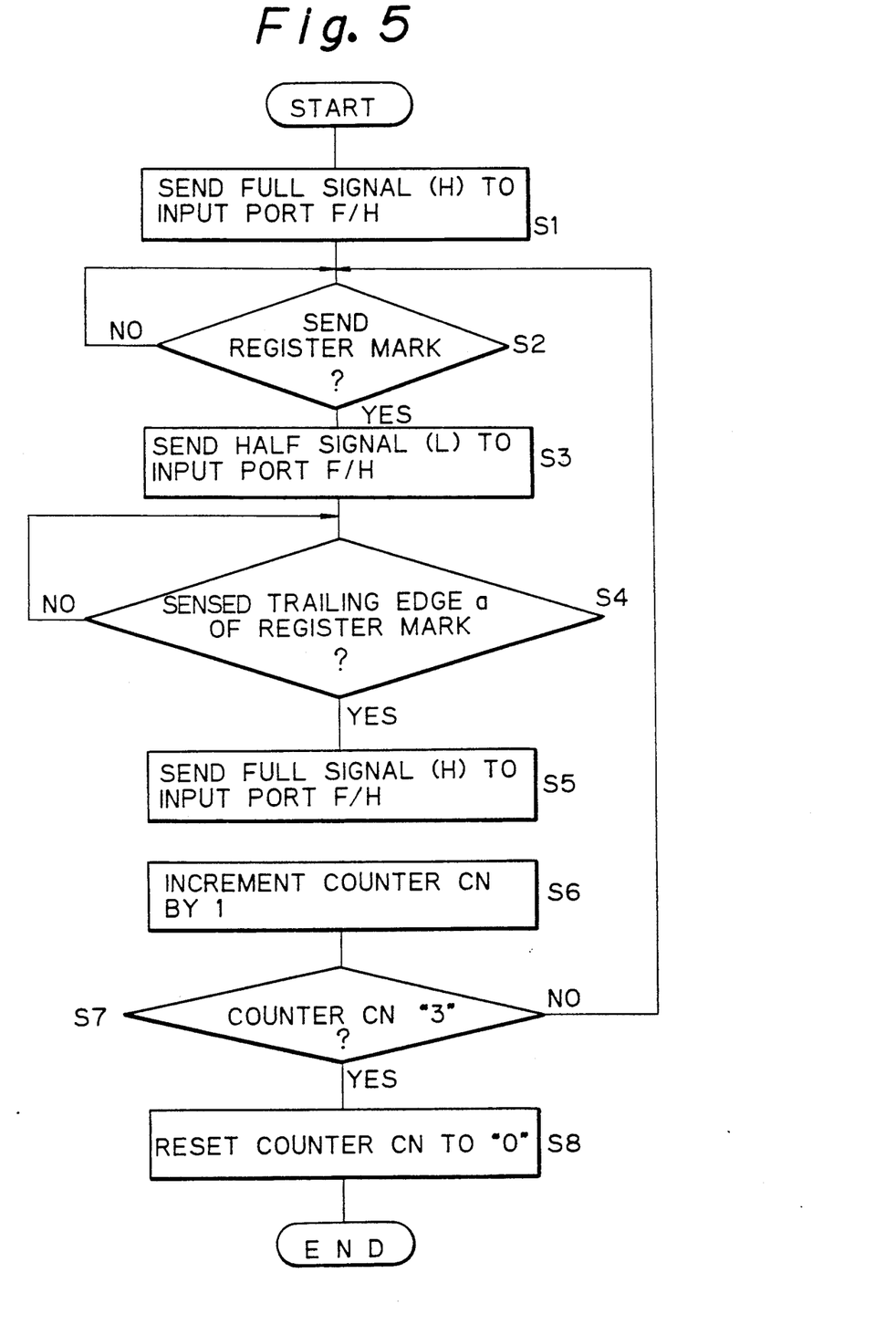
FIG. 5 is a flowchart demonstrating a specific operation of the embodiment for changing over a step angle.

The operation will be described with reference to FIGS. 3 and 5. FIG. 3 shows a relation between the transport of the recording medium 2 and the stop positions of the pulse motor 7, while FIG. 5 shows a specific sequence of step angle changeover control. After the register mark A has been formed on the recording medium 2, the controller 12 continuously feeds a FULL signal or "H" to the input port F/H of the pulse motor driver 11 until the sensor 9 senses the register mark A (step S1, FIG. 5). As soon as the sensor 9 senses the register mark A, the controller 12 delivers a clock signal to the input port CW of the pulse motor driver 11 and a HALF signal or "L" to the input port F/H (S2 and S3, FIG. 5). As a result, the pulse motor 7 is driven forward on a half step basis to in turn transport the medium 2 half a line per step. When the sensor 9 senses the trailing edge α of the register mark A, the controller 12 continuously feeds a clock signal to the input port CW of the pulse motor driver 11 and a FULL signal "H" to the input port F/H in place of the HALF signal "L" (S4 and S5, FIG. 5). Consequently, the pulse motor 7 is driven forward on a full step basis to in turn transport the recording medium 2 one line per step. In this condition, even through the sensor 9 may sense the trailing edge α of the register mark A, the step angle of that instant is a half step angle. Therefore, the displacement of the medium 2 during the interval between the above-mentioned instant and the first stop to occur thereafter is half a line at most, compared to the case wherein the pulse motor 7 is driven on a full step basis. This is successful in reducing the deviation among the color components Y, M and C.

After the entire image component has been developed, the controller 12 stops sending the clock signal to the input port CW of the pulse motor driver 11 and, instead, sends a clock signal to the input port CCW while continuously sending the FULL signal "H" to the input port F/H. As a result, the pulse motor 7 is reversed on a full step basis to transport the recording medium 2 one line per step in the reverse direction.

Thereafter, the medium 2 is transported in the reverse direction until the sensor 9 senses the register mark A again. Such control over the pulse motor 7 is repeated with the other color components also (S6-S8, FIG. 5).

In the above embodiment, the pulse motor 7 moves the recording medium 2 relative to the record head 3 which is fixed in place. Alternatively, the pulse motor 7 may move the record head 3 relative to the recording medium 2 which is fixed in place.

Figure 6:
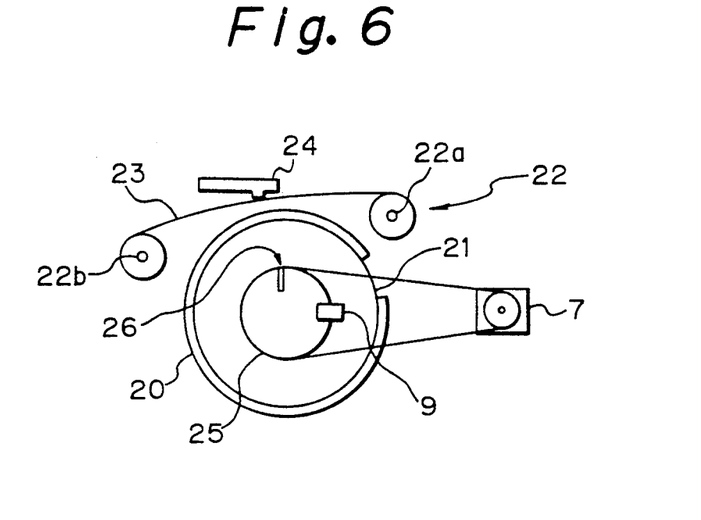
FIG. 6 is a view showing an alternative embodiment of the present invention.

Referring to FIG. 6, an alternative embodiment of the present invention and implemented as a thermal color printer will be described. As shown, a recording medium in the form of a sheet 20 is wrapped around a drum 21 which is driven by the pulse motor 7. Arranged in the vicinity of the drum 21 are a roller pair 22 made up of rollers 22a and 22b, an ink sheet 23 passed over the roller pair 22, and a thermal head 24 for recording an image on the sheet 20 via the ink sheet 23. The ink sheet 23 and thermal head 24 play the role of a recording device in combination. The ink sheet 23 has zones each carrying ink of particular color, i.e., Y, M or C. The roller pair 22 is rotated to selectively bring any one of such zones of the ink sheet 23 to a position where it faces the thermal head 24. More specifically, the thermal head 24 forms Y, M and C image components one above another on the recording medium 20 on the drum 21 by selecting the color of ink to be transferred to the sheet 20, thereby producing a color print.

With this embodiment, it is also desirable that the deviation among the Y, M and C image components with respect to the first line to be recorded be reduced to reduce the deviation among the colors. For this purpose, a cam 25 is provided which is rotatable in synchronism with the drum 21. A slit 26 is formed in the cam 25 at a position corresponding to the print start position. The control over the start of printing by the thermal head 24 is effected on the basis of the output of the optical sensor 9 representative of the trailing edge of the slit 26 with respect to the direction of rotation of the cam 25. While the sensor 9 is determining whether or not the slit 26 has reached it, e.g., while it is sensing the slit 26, the displacement of the recording sheet 20 per step of the pulse motor 7 is changed over to a displacement smaller than a displacement occurring during the printing operation. For example, the pulse motor 7 is driven on a full step basis during printing to transport the recording sheet 20 one line per step while, during the interval wherein the sensor 9 is determining whether or not the trailing edge of the slit 26 has reached it, the motor 7 is driven on a half step basis, as in the previous embodiment. The sensor 9 may be mounted on the cam 25, if desired.

Figure 7:
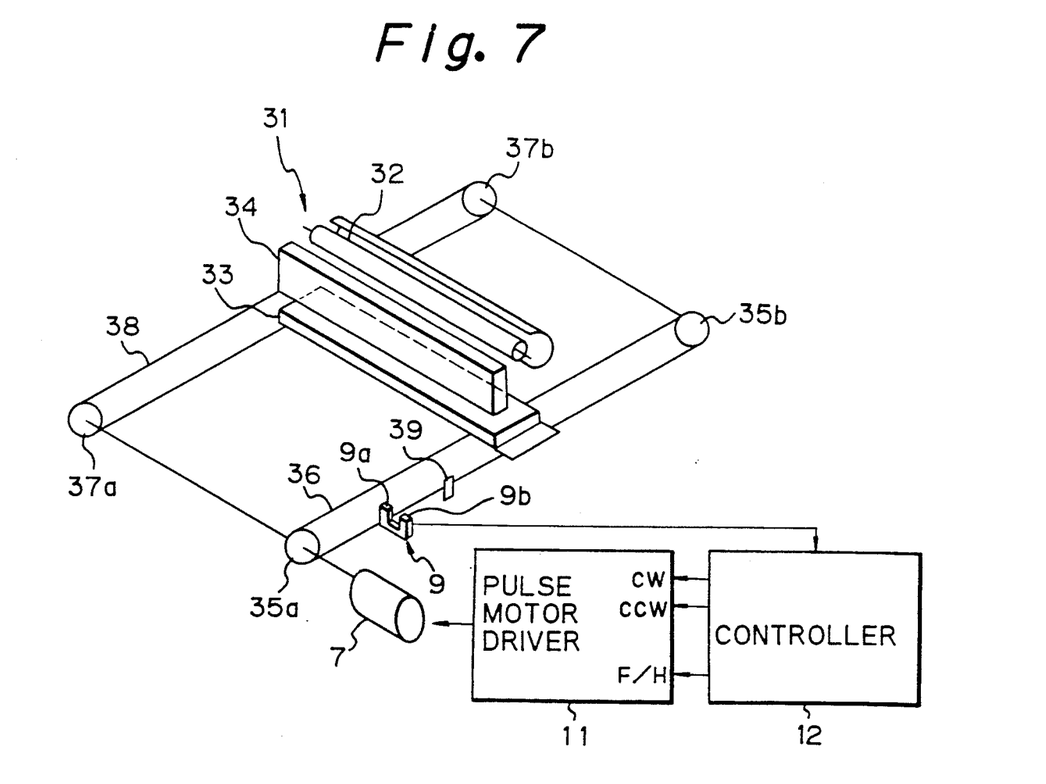
FIG. 7 is a view showing another alternative embodiment of the present invention.

Referring to FIG. 7, another alternative embodiment of the present invention is shown and implemented as a document reader incorporated in color image forming equipment. The document reader reads a document by separating it into red (R), green (G) and blue (B) components. As shown, the pulse motor 7 drives movable scanning optics 31. The document reader reads a single document three consecutive times while transferring the resulting image data to a printer, not shown, each time. Reading a document three times as mentioned is desirable when, for example, use is not made of a storage (memory) having a capacity great enough to store all the image data read out of a document. Every time the printer receives the image data, it prints out a corresponding image component Y, M or C. As a result, Y, M and C image components are sequentially formed one above another on a single recording medium. Therefore, to read the colors of an image accurately, it is desirable that the deviation regarding the read start position be reduced by the three times of document reading.

As shown in FIG. 7, the optics 31 has a lamp 32 for illuminating a document, a photoelectric transducer (x1 sensor) 33, and a focusing element 34 for focusing a reflection from the document onto the photoelectric transducer 33. The focusing element 34 may be implemented by SELFOC (trade name), for example. Opposite ends of the optics 31 with respect to the lengthwise direction are affixed to wires 36 and 38 such that the optics 31 extends parallel to a glass platen, not shown. The wires 36 and 38 are passed over pulleys 35a and 35b and pulleys 37a and 37b, respectively. The pulse motor 7 reversibly rotates the pulleys 35a, 35b, 37a and 37b to move the the wires 36 and 38 in either direction, whereby the optics 31 is moved in a reciprocating motion below the glass platen and in parallel with a document laid on the glass platen. During a scanning or forward movement, the optics 31 illuminates the document by the lamp 32. A piece 39 is affixed to the wire 36 while the optical sensor 9 is made up of a light emitting element 9a and a light-sensitive element 9b which face each other with the intermediary of the wire 36. As the piece 39 is moved to between the light emitting element 9a and the light-sensitive element 9b by the wire 36, the output of the light-sensitive element 9b changes. Specifically, the position where the interrupting piece 39 is affixed to the wire 36 is such that the sensor 9 senses the trailing edge a of the interrupting piece 39 when the optics 31 reaches a position for starting reading a document during the forward movement.

In this embodiment, while the sensor 9 is determining whether or not the trailing edge of the piece 39 has reached the sensor 9 during the forward movement, i.e., while the sensor 9 is sensing the piece 39 in this embodiment, the displacement of the optics 31 per step of the pulse motor 7 is changed over to a displacement smaller than a displacement occurring during reading and a reverse movement or return. For example, an arrangement may be made such that the pulse motor 7 drives the optics 31 one line per pulse on a full step basis during reading and reverse movement or drives it on a half step basis while the sensor 9 is determining whether or not the trailing edge of the piece 39 has reached the sensor 9 during the forward movement, as in the embodiment shown in FIGS. 1 through 4. Again, the pulse motor 7 may be implemented as a 5-phase motor whose full step angle is 0.72 degree. The input and output signals of the pulse drive motor 11 described with reference to FIG. 4 are also applicable to this embodiment. If desired, while the embodiment is in a standby state, the optics 31 may be held in a halt at the position where the sensor 9 senses the piece 39, i.e., a home position.

Figure 8:
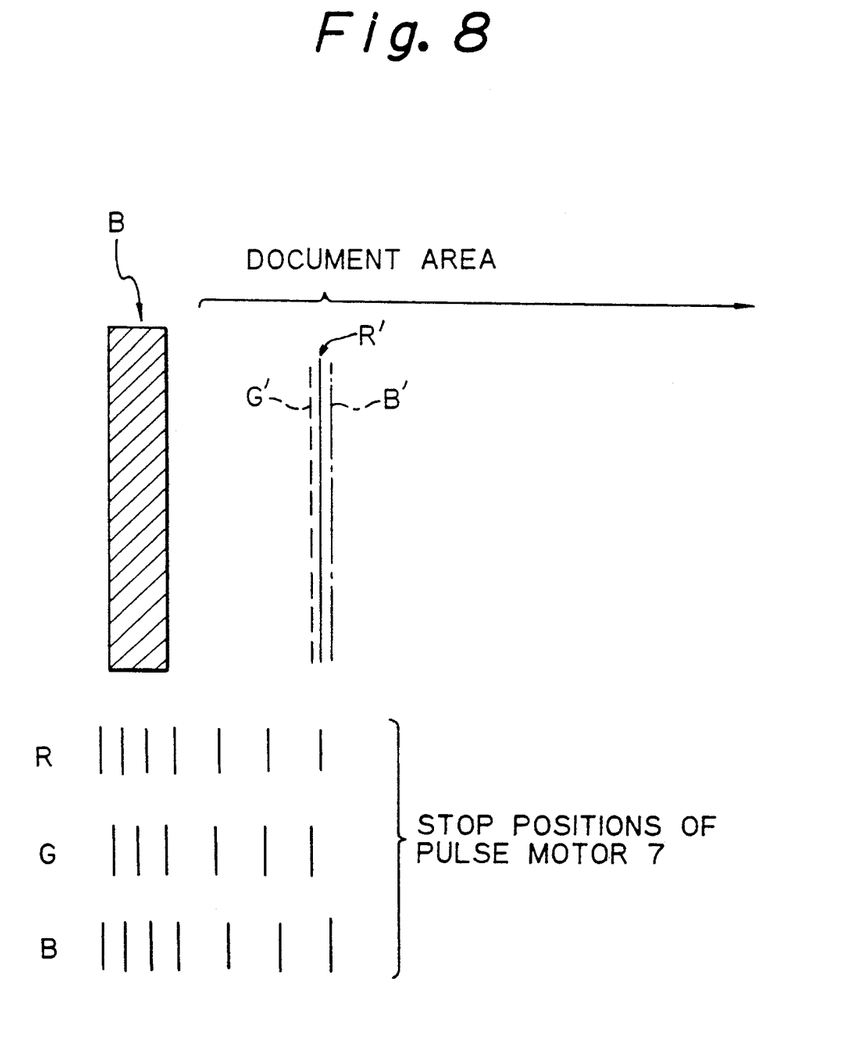
FIG. 8 shows the movement of optics included in the embodiment of FIG. 7 and effected by the changeover of the step angle of a pulse motor.
Figure 9:
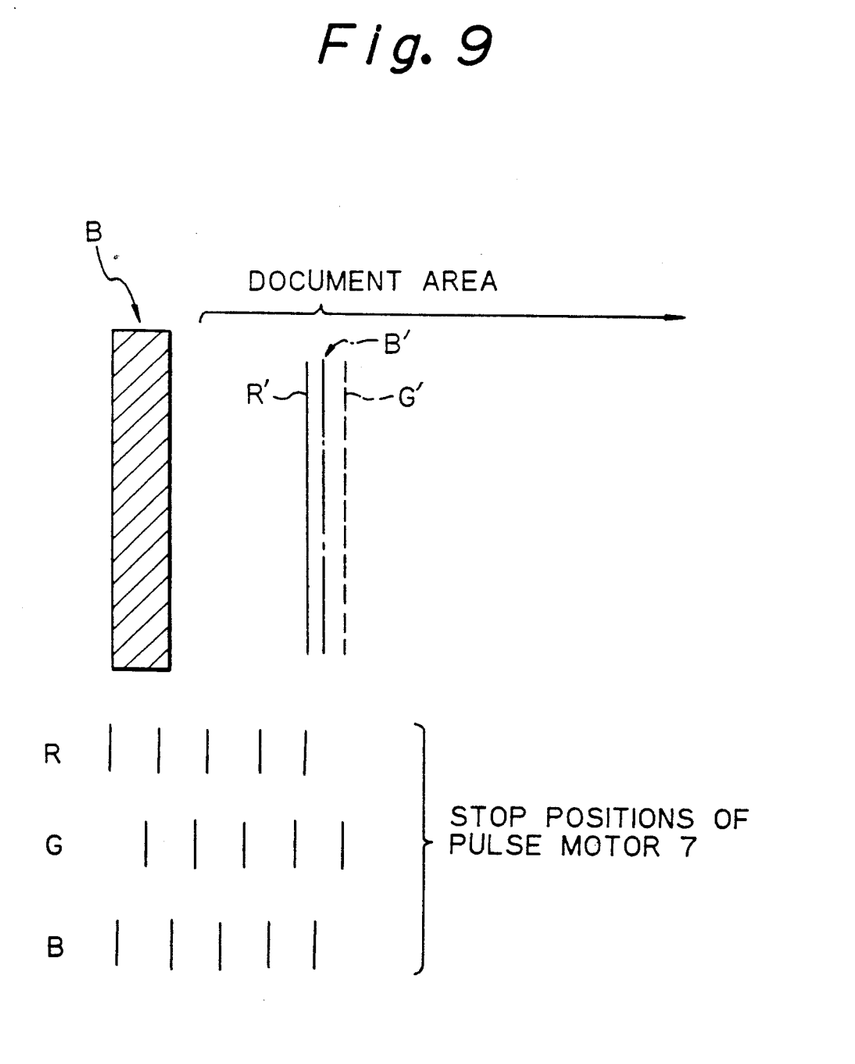
FIG. 9 shows the movement of optics occurring when the step angle of the pulse motor is not changed over.

FIG. 8 corresponds to FIG. 3 and shows the movement of the optics 31. In FIG. 8, R', G' and B' each is representative of the position of a document which the optics 31 faces when brought to a stop by the first step after the sensor 9 has detected the trailing edge α of the piece 39 during the forward movement, i.e., a read start position associated with the first (R), second (G) or third (B) reading operation. A home position labeled B in FIG. 8 is indicative of an area which the optics 31 faces while the sensor 9 is sensing the piece 39. FIG. 9 corresponds to FIG. 2 and shows the movement of the optics 31 which will occur if such a changeover is not effected. By comparing FIGS. 8 and 9, it will be seen that this embodiment reduces the deviation among the R, G and B read start positions to half a line at most. If desired, a document may be transported by the pulse motor 7 or similar step drive device relative to optics which is fixed in place.

In the embodiments shown and described, one line of displacement for recording or reading is implemented by one step of drive (full step angle) of the pulse motor 7. Alternatively, one line of displacement may be effected by, for example, four steps of drive of the pulse motor 7. Then, the one step drive may be replaced with a half step drive while whether or not the recording medium 2, for example, has reached a reference or start position is examined, reducing the deviation among colors to one-eighth of a line.

The embodiments have concentrated on a case wherein an image recording, image reading or similar image forming operation is repeated a plurality of times and have contemplated to reduce the deviation among the consecutive operations as to the start timing. Of course, the present invention is practicable even with equipment of the type performing a predetermined image forming movement only once and is capable of reducing the deviation of such a single movement.

In summary, it will be seen that the present invention provides image forming equipment which reduces, without increasing the time necessary for an image recording or similar image forming movement to be completed, the error in the control over the start of image forming movement which uses a predetermined position as a reference. When the present invention is applied to equipment of the type moving a recording medium and a recording device relative to each other to sequentially overlay a plurality of image components on the medium, it is possible to reduce the deviation among the image components. Further, when the present invention is applied to equipment of the type moving a single document and a document reader relative to each other to read the document a plurality of times and generating image data representative of the single document, the deviation among the consecutive reading movements as to the start position is reduced to enhance accurate document reading.

Various modifications will become possible for those skilled in the art after receiving the teachings of the present disclosure without departing from the scope thereof.

What is claimed is:

1. Image forming equipment for starting a predetermined image forming operation by moving movable means while using a predetermined position as a reference, comprising:
   stepwise drive means for moving said movable means stepwise in said equipment to execute said predetermined image forming operation;
   sensing means for determining whether or not said movable means has reached said predetermined position; and
   displacement changing means for changing over the displacement of said movable means per step of said stepwise drive means such that while said sensing means is determining whether or not said movable means has reached said predetermined position, said displacement is changed to a displacement per step smaller than a displacement effected when said predetermined image forming operation is under way.

2. Equipment as claimed in claim 1, wherein said movable means comprises either one of a recording medium and recording means for recording an image on said recording medium.

3. Equipment as claimed in claim 2, wherein said predetermined image forming operation comprises the operation of said recording means for recording an image on a recording medium such that a plurality of image components are sequentially ovelayed on said recording medium.

4. Equipment as claimed in claim 1, wherein said movable means comprises either one of a document and document reading means.

5. Equipment as claimed in claim 4, wherein said predetermined image forming operation comprises the operation of said document reading means for reading a document a plurality of times to generate image data representative of said document.

6. Image forming equipment for starting a predetermined image forming operation by moving a recording medium comprising:
   forming means for forming a register mark on the recording medium in a position preceding an image forming area;
   stepwise drive means for moving said recording medium stepwise in said equipment to execute said predetermined image forming operation;
   sensing means for detecting a leading edge of said image forming area by sensing the register mark; and
   displacement changing means for changing over the displacement of said recording medium per step of said stepwise drive means such that before said sensing means detects the leading edge of said image forming area, said displacement is changed to a displacement per step smaller than a displacement effected when said predetermined image forming operation is underway.

7. Equipment as claimed in claim 6, wherein said forming means comprises recording means for recording the register mark on said recording medium.

8. Equipment as claimed in claim 7, wherein said predetermined image forming operation comprises the operation of said recording means for recording an image on the recording medium such that a plurality of image components are sequentially overlaid on said recording medium.

* * * * *